United States Patent [19]

Burnand et al.

[11] Patent Number: 5,030,250

[45] Date of Patent: Jul. 9, 1991

[54] MANUFACTURE OF ABRASIVE PRODUCTS

[76] Inventors: Richard P. Burnand, 39 Constantia Avenue, Alan Manor, Johannesburg, Transvaal; Raymond A. Chapman, 183 Columbine Avenue, Mondeor, Johannesburg, Transvaal; Trevor J. Martell, 8 Erica Place, Vale Road, Weltevreden Park, Transvaal; Stephen A. Parsons, 199 Downham Avenue, Mondeor, Johannesburg, Transvaal, all of South Africa

[21] Appl. No.: 400,367

[22] Filed: Aug. 30, 1989

[30] Foreign Application Priority Data

Aug. 31, 1988 [ZA] South Africa ............. 88/6473

[51] Int. Cl.⁵ ................................. B24D 3/00
[52] U.S. Cl. ............................ 51/293; 51/303; 51/309
[58] Field of Search ................. 51/293, 303, 309

[56] References Cited

U.S. PATENT DOCUMENTS

| | | | |
|---|---|---|---|
| 3,743,489 | 7/1973 | Wentrof Jr. et al. | 51/307 |
| 3,745,623 | 7/1973 | Wentrof Jr. et al. | 29/95 |
| 3,767,371 | 10/1973 | Wentrof Jr. et al. | 51/293 |
| 4,063,909 | 12/1977 | Mitchell | 51/309 |
| 4,469,802 | 9/1984 | Endo et al. | 501/96 |

FOREIGN PATENT DOCUMENTS 0278703 8/1988 European Pat. Off. .

*Primary Examiner*—William R. Dixon, Jr.
*Assistant Examiner*—Willie J. Thompson
*Attorney, Agent, or Firm*—Scully, Scott, Murphy & Presser

[57] ABSTRACT

The inventin provides a method of making an abrasive product which comprises a layer of bonded ultra-hard abrasive particles bonded to a substrate. This abrasive product is typically a composite abrasive compact. The method includes the steps of:

(a) providing a slurry of the components, in particulate form, necessary to make the layer of bonded ultra-hard abrasive particles in a liquid which contains a binder dissolved or dispersed therein;

(b) providing the substrate which has side surfaces and an end surface to which the layer of bonded ultra-hard abrasive particles is to be bonded;

(c) providing a container which is adapted to receive the substrate such that the side surfaces thereof form a close fit with the container;

(d) placing a quantity of the slurry in the container;

(e) inserting the substate into the container such that the slurry is pressed between the container and the surface of the substrate to which the layer of bonded ultra-hard abrasive particles is to be bonded;

(f) removing substantially all the liquid and binder from the slurry; and (g) subjecting the contents of the container to suitable elevated temperature and pressure conditions in the reaction zone of a high temperature/high pressure apparatus.

9 Claims, 1 Drawing Sheet ns with a suitable liquid, preferably water, which contains the binder dissolved or dispersed therein. The binder is preferably one which decomposes or volatilises at a temperature of about 350° C. or lower. Examples of suitable binders are organic binders such as cellulose ethers or esters which are capable of volatilising or decomposing under the influence of heat. An example of a particularly suitable binder is methyl cellulose. The slurry will preferably have a viscosity such as to allow it to flow. It may, for example, be poured or injected into the container.

MANUFACTURE OF ABRASIVE PRODUCTS

BACKGROUND OF THE INVENTION

This invention relates to the manufacture of abrasive products.

Abrasive compacts are used extensively in cutting, milling, grinding, drilling and other abrasive operations. The abrasive compacts consist of a mass of diamond or cubic boron nitride particles bonded into a coherent, polycrystalline hard conglomerate. The abrasive particle content of abrasive compacts is high and there is an extensive amount of direct particle-to-particle bonding. Abrasive compacts are made under elevated temperature and pressure conditions at which the abrasive particle, be it diamond or cubic boron nitride, is crystallographically stable.

Abrasive compacts tend to be brittle and in use they are frequently supported by being bonded to a cemented carbide substrate. Such supported abrasive compacts are known in the art as composite abrasive compacts. The composite abrasive compact may be used as such in the working surface of an abrasive tool.

Examples of composite abrasive compacts can be found described in U.S. Pat. Nos. 3,745,623, 3,767,371, 3,743,489 and 4,063,909.

Composite abrasive compacts are generally produced by placing the components, in powdered form, necessary to form an abrasive compact on a cemented carbide substrate. This unbonded assembly is placed in a reaction capsule which is then placed in the reaction zone of a conventional high pressure/high temperature apparatus. The contents of the reaction capsule are subjected to conditions of elevated temperature and pressure at which the abrasive particles are crystallographically stable.

Other effective cubic boron nitride abrasive bodies which do not contain as high an abrasive particle content as abrasive compacts are also known and used in the art. Such abrasive bodies generally comprise a sintered body containing 40 to 60 volume percent of cubic boron nitride particles uniformly dispersed in a continuous ceramic bonding matrix. These abrasive bodies are also made under temperature and pressure conditions at which the cubic boron nitride is crystallographically stable. U.S. Pat. No. 4,469,802 describes such a body.

European Patent Publication No. 0278703 published Aug. 17, 1988 describes and claims a method of making an abrasive body which comprises a layer of bonded ultra-hard abrasive particles bonded to a substrate, including the steps of providing the substrate, depositing a layer of the components necessary to form the layer of bonded ultra-hard abrasive particles, in particulate form, in an organic binder on a surface of the substrate, and subjecting the substrate and layer to conditions of elevated temperature and pressure at which the ultra-hard abrasive particle is crystallographically stable. The layer of particulate components may be deposited on the surface of the substrate by suspending the particulate components in a liquid containing the organic binder dispersed or dissolved therein, depositing the liquid suspension on the surface and removing the liquid from the suspension. The layer of bonded ultra-hard abrasive particles will typically be a diamond or cubic boron nitride abrasive compact.

SUMMARY OF THE INVENTION

According to the present invention, there is provided a method of making an abrasive product which comprises a layer of bonded ultra-hard abrasive particles bonded to a substrate, including the steps of:
(a) providing a slurry of the components, in particulate form, necessary to make the layer of bonded ultra-hard abrasive particles in a liquid which contains a binder dissolved or dispersed therein;
(b) providing the substrate which has side surfaces and an end surface to which the layer of bonded ultra-hard abrasive particles is to be bonded;
(c) providing a container which is adapted to receive the substrate such that the side surfaces thereof form a close fit with the container;
(d) placing a quantity of the slurry in the container;
(e) inserting the substrate into the container such that the slurry is pressed between the container and the surface of the substrate to which the layer of bonded ultra-hard abrasive particles is to be bonded;
(f) removing substantially all the liquid and binder from the slurry;
(g) placing the container in the reaction zone of a high temperature/high pressure apparatus;
(h) applying conditions of elevated temperature and pressure to the container to convert the slurry into a layer of bonded ultra-hard abrasive particles which is bonded to the substrate;
(i) recovering the container from the reaction zone; and
(j) removing the container from at least the layer of bonded ultra-hard abrasive particles.

DESCRIPTION OF EMBODIMENTS

Figure 1:
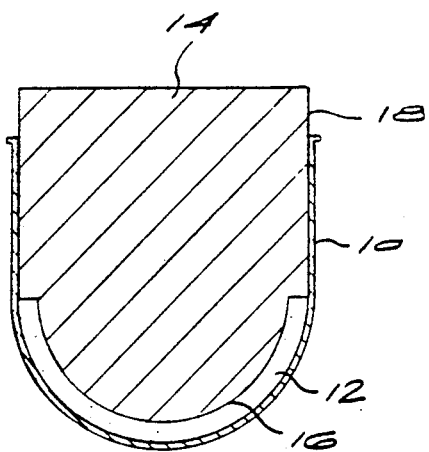
FIGS. 1 to 3 illustrate sectional side views of loaded containers useful in the practice of the invention.
Figure 2:
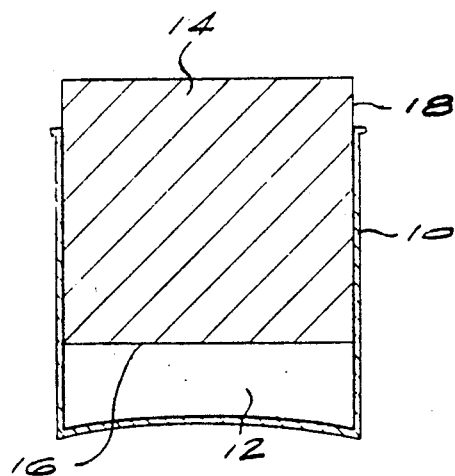
Figure 3:
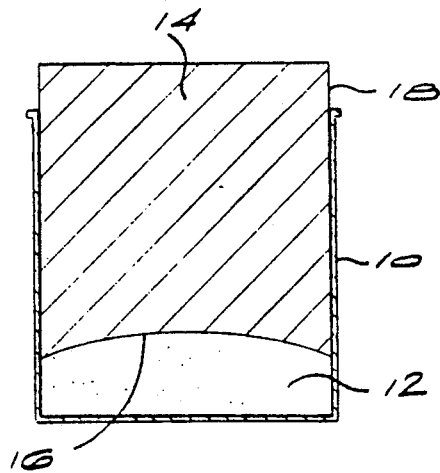

The slurry is made by mixing the particulate components with a suitable liquid, preferably water, which contains the binder dissolved or dispersed therein. The binder is preferably one which decomposes or volatilises at a temperature of about 350° C. or lower. Examples of suitable binders are organic binders such as cellulose ethers or esters which are capable of volatilising or decomposing under the influence of heat. An example of a particularly suitable binder is methyl cellulose. The slurry will preferably have a viscosity such as to allow it to flow. It may, for example, be poured or injected into the container.

The slurry may have other ingredients such as plasticisers and surfactants and the like to assist in wetting the particulate components and improving the general rheological properties of the slurry. An example of a suitable plasticiser is polyethylene glycol.

The container is preferably a thin walled container or canister made of a material such as zirconium, titanium, tantalum, molybdenum or the like.

The removal of the liquid and the binder is preferably achieved by heating. This heating will preferably take place in two stages. When the liquid is water, the slurry may be heated to a temperature above 100° C. to drive off the water. Thereafter, the slurry will be heated to such a temperature as to cause the binder to decompose or volatilise.

The conditions of elevated temperature and pressure which are used in step (h) are typically a pressure in the range 25 to 70 kilobars and a temperature in the range 1400° to 1600° C. Typically, these elevated conditions are maintained for a period of 10 to 30 minutes.

The invention has particular application to the manufacture of composite abrasive compacts comprising a diamond or cubic boron nitride abrasive compact bonded to a cemented carbide substrate. The abrasive particles of the abrasive compact may be self-bonded or there may be present a second phase. It is preferred that the abrasive compact has a second phase. When the abrasive particles are diamond, the second phase will typically be, or contain, a catalyst or solvent for diamond manufacture such as cobalt. When the abrasive particles are cubic boron nitride, the second phase will typically contain or consist of aluminium, an aluminium alloy or ceramic compound.

The size of the particles of the components will vary according to the nature of the layer of bonded ultra-hard abrasive particles being produced. Generally, these particles will be fine, for example having a size of less than 150 microns.

The end surface of the substrate to which the layer of the bonded ultra-hard abrasive particles is to be bonded may take on any one of a number of shapes such as straight, curved, zig-zag and the like. The invention has particular application for producing products where the end surface of the substrate is curved, particularly a curved convex surface. The method of the invention allows the particulate components for producing the layer of bonded ultra-hard abrasive particles to be held in intimate contact with such a surface and products having curved ends to be produced.

The substrate will typically be made of cemented carbide such as cemented tungsten carbide, cemented tantalum carbide, cemented titanium carbide or a mixture thereof.

Embodiments of the invention will now be described with reference to the accompanying drawings. The embodiments are similar and like parts carry like numerals. Referring to the drawings, there is shown a zirconium container or canister 10 into which a quantity of slurry 12 is introduced, for example, by means of a syringe. The slurry consists of a mass of diamond particles suspended in water which contains methyl cellulose dissolved therein. Thereafter, a cemented carbide substrate 14 is pushed into the canister to press or squeeze the slurry 12 between the canister and the end surface 16 of the substrate. The canister and substrate both have a circular section of substantially the same dimensions so the substrate side surfaces 18 fit snugly in the canister. These side surfaces 18 of the substrate contact the inner surface of the canister.

The loaded canister is then heated, for example in an oven, to a temperature above 100° C. to drive off the water from the slurry. Thereafter, the canister is heated to a temperature of approximately 350° C. to cause the methyl cellulose to decompose.

The loaded canister is placed in a complementary recess formed in a suitable pressure transmitting medium which is then placed in the reaction zone of a high temperature/high pressure apparatus. The contents of the reaction zone are subjected to a temperature of 1500° C. and a pressure of 55 kilobars and these conditions are maintained for a period of 10 minutes. The canister is removed from the reaction zone. The canister may be removed from the now bonded diamond layer 12 and also from the cemented carbide substrate 14, if desired, by grinding or other suitable means.

The resulting products are all composite abrasive compacts consisting of a cemented carbide substrate having a diamond abrasive compact bonded thereto. The composite abrasive compacts, as illustrated by the three embodiments, can take on any one of a number of configurations. The invention enables these configurations to be produced in an effective and relatively simple manner. In particular, the invention has been found to be effective, for producing a variety of composite compacts from loaded canisters of the type illustrated by FIG. 1.

We claim:

1. A method of making an abrasive product which comprises a layer of bonded ultra-hard abrasive particles bonded to a substrate, including the steps of:
   (a) providing a slurry of an abrasive selected from the group consisting of diamond and cubic boron nitride, an organic binder and water;
   (b) providing a cemented carbide substrate which has side surfaces and an end surface to which the layer of bonded ultra-hard abrasive particles is to be bonded;
   (c) providing a container, said container constructed of a material selected from the group consisting of zirconium, titanium, tantalum and molybdenum, which is adapted to receive the substrate such that the side surfaces thereof form a close fit with the container;
   (d) placing a quantity of the slurry in the container;
   (e) inserting the substrate into the container such that the slurry is pressed between the container and the surface of the substrate to which a layer of ultra-hard abrasive is to be bonded;
   (f) removing substantially all the slurry by heating said slurry to a temperature of about 350° C. or lower;
   (g) placing the container in the reaction zone of high temperature zone/high pressure apparatus;
   (h) applying conditions of elevated temperature and pressure to the container to convert the slurry into a layer of bonded ultra-hard abrasive particles which is bonded to the substrate;
   (i) recovering the container from the reaction zone; and
   (j) removing the container from at least the layer of bonded ultra-hard abrasive particles.

2. A method according to claim 1 wherein the organic binder is capable of decomposing or volatilising at a temperature of about 350° C. or lower.

3. A method according to claim 2 wherein the organic binder is selected from the group consisting of cellulose ethers and cellulose esters.

4. A method according to claim 3 wherein the organic is methyl cellulose.

5. A method according to claim 1 wherein the slurry has a viscosity such as to allow it to flow.

6. A method according to claim 1 wherein the water and organic binder are removed from the slurry by heating.

7. A method according to claim 1 wherein the end surface of the substrate to which the layer of bonded ultra-hard abrasive particles is to be bonded is curved.

8. A method according to claim 7 wherein the curved surface is convex.

9. A method according to claim 1 wherein the conditions of elevated temperature and pressure used in step (h) are a pressure in the range 25 to 70 kilobars and a temperature in the range 1400° to 1600° C.

* * * * *

UNITED STATES PATENT AND TRADEMARK OFFICE
CERTIFICATE OF CORRECTION

PATENT NO. : 5,030,250
DATED : July 9, 1991
INVENTOR(S) : Richard P. Burnand, et al.

It is certified that error appears in the above-identified patent and that said Letters Patent is hereby corrected as shown below:

In the Abstract, line 1: "inventin" should read as --invention--

In the Abstract, line 17: "substate" should read as --substrate--

Column 4, line 53, Claim 4: "organic is" should read as --organic binder is--

Signed and Sealed this

Twelfth Day of January, 1993

Attest:

DOUGLAS B. COMER

*Attesting Officer*   Acting Commissioner of Patents and Trademarks